United States Patent [19]
Redman

[11] 3,987,366
[45] Oct. 19, 1976

[54] SQUARE ROOT OF TRANSIENT CIRCUIT

[75] Inventor: Charles M. Redman, Las Cruces, N. Mex.

[73] Assignee: The United States of America as represented by the Secretary of the Army, Washington, D.C.

[22] Filed: Oct. 22, 1974

[21] Appl. No.: 516,859

[52] U.S. Cl. ............................ 328/144; 235/193.5
[51] Int. Cl.² ................................. G06G 7/20
[58] Field of Search ............. 328/144; 235/193.5; 307/309

[56] References Cited
UNITED STATES PATENTS

| | | | |
|---|---|---|---|
| 3,284,726 | 11/1966 | Kotecki | 328/144 X |
| 3,328,569 | 6/1967 | Brewster | 328/144 X |
| 3,398,297 | 8/1968 | Huen | 328/144 X |
| 3,663,833 | 5/1972 | Pao et al. | 328/144 X |
| 3,795,868 | 3/1974 | Ohme et al. | 328/144 |

Primary Examiner—John S. Heyman
Attorney, Agent, or Firm—Nathan Edelberg; Robert P. Gibson; Saul Elbaum

[57] ABSTRACT

A circuit for reducing the center frequency and bandwidth of microwave signals comprising a source of radar pulses, a Hall element for doubling frequency of signals derived in the circuit. The Hall element is connected in the feedback circuit of a comparator amplifier the purpose of which is to provide a difference signal between the radar input signal and the signal from the Hall element. A first RC network is provided at the output of the Hall element to balance the circuit derived signal about zero. A second RC network is provided at the output of the comparator amplifier to balance the output signal from the circuit about zero. The output signal, by action of the circuit elements, is a signal having its center frequency and bandwidth reduced by one half. Means are also provided to cascade circuits and to add radar target simulation to final output signal.

8 Claims, 6 Drawing Figures

SQUARE ROOT OF TRANSIENT CIRCUIT

The invention described herein may be manufactured, used and licensed by or for the United States Government for governmental purposes without the payment to me of any royalty thereon.

This invention is related to target simulation for radar testing. More particularly, this invention relates to means for reducing the center frequency and bandwidth of radar type signals for purposes of easier signal processing.

BACKGROUND OF THE INVENTION

The testing and evaluation of complex radar systems require special testing techniques. These testing techniques must be capable of processing radar transmissions which are in the 1 GHZ to 10 GHZ frequency range and have 500 MHZ bandwidths. The high center frequency and bandwidth makes signal processing difficult. The center frequency problem can be solved with simple heterodyning of the higher frequency to a lower one. However, this does not solve the bandwidth problem but only makes it worse as the bandwidth to center frequency ratio increases.

In the case of radar target simulators where it is desired to delay the radar signals in fiber acoustic wave guides by one millisecond or more to account for a range delay, a reduction in the center frequency and bandwidth is of great interest. For example, a yttrium-iron-garnett (YIG) acoustic delay line crystal attenuates a 400 MHZ signal about 0.031 db per microsecond. A one millisecond delay for 400 MHZ would, therefore be 31 db and for 4000 MHZ, 3100 db which shows the importance of center frequency reduction. As stated above, reducing the center frequency without reducing bandwidth can cause the modulation index to become unreasonably large. Therefore, frequency division becomes of great interest since it keeps a constant modulation index.

BRIEF DESCRIPTION OF THE INVENTION

The present invention employs a circuit comprising high gain RF comparator amplifiers, Hall elements and microwave integrated circuit construction to divide the frequencies in transients or radar type pulses by 2 and obtain the square root of the transient amplitude.

Accordingly, it is an object of this invention to provide a microwave circuit capable of reducing the center frequency and bandwidth of radar type pulses for purposes of easier signal processing.

It is another object of the invention to provide a circuit for frequency dividing while maintaining pulse amplitude integrity.

In order to gain a better understanding of the invention, as well as other objects and further features thereof, reference is made to the following detailed description of the invention to be read in conjunction with the accompanying drawing wherein.

Figure 1:
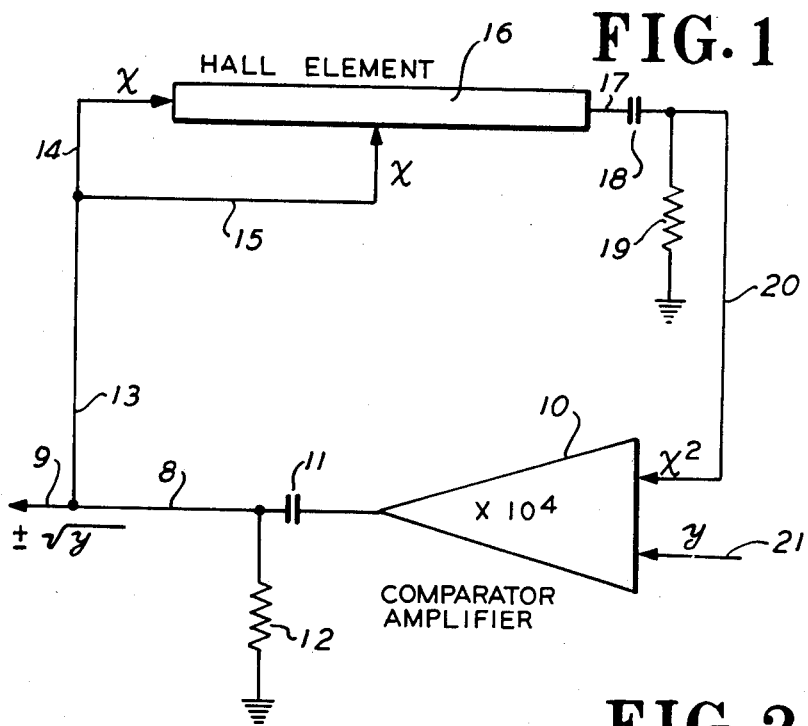
FIG. 1 is a schematic diagram of the circuit components of the invention.

Referring now to FIG. 1, there is shown a schematic diagram of the circuit of the invention. Signal Y appearing on conductor 21 at the input to the comparator amplifier 10 is to be divided in frequency by a factor of two. This signal is assumed to be a transient such as radar transmission pulse. The RC network consisting of capacitor 18 and resistor 19 balances the $X^2$ waveform appearing on conductor 20 about zero for comparison with the radar pulse, Y, which is most normally balanced about zero. The signal $X^2$ is the output from the Hall element 16 and is derived as will become clearer as the discussion of the overall circuit ensues. Alternately, signal Y may be offset negative from 0 balance by half the peak-to-peak magnitude of the signal. In which case Y would always be negative. Balancing Y offset negative from zero or balancing Y about zero would be satisfactory either way. However, balancing $X^2$ about 0 may be easier than properly offsetting Y.

Signal Y is compared to signal $X^2$ at the input to the comparator amplifier 10. The difference between the two signals is amplified a large amount by the comparator amplifier 10. In the circuit shown, the difference signal $\pm \sqrt{Y}$ is amplified by a factor of 10,000. This signal is then balanced about 0 by the RC circuit consisting of capacitor 11 and resistor 12, and an output of the signal is obtained on conductor 9. This signal is also fed via conductors 8, 13, 14, and 15 to Hall element 16 and drives the Hall element through its current input on conductor 14 and flux input on conductor 15. Hall element 16 performs the function of some constant K, times current input times flux input times the cosine of the angle between them. In this case, the flux and current signals are assumed to be in phase. Therefore, the output of the Hall element on conductor 17 is simply the constant K, times $X^2$. Since $(-X)^2$ and $(+X)^2$ are both plus, the output of the Hall element is always plus. The inputs Y and $X^2$ to comparator amplifier 10 are then equal but opposite in polarity within the limits of the factors K and 1/10,000. The output signal is, therefore, very close to $\pm \sqrt{Y}$. The higher the gain in the comparator amplifier, the closer the output is to $\pm \sqrt{Y}$.

The circuit of FIG. 1 may be further explained by the equation which follows where Y is the input radar signal, $X^2$ is the output of the Hall element, and the amplification factor of the comparator amplifier is 10,000:

$$X = (X^2 - Y)10^4$$

$$X = 10^4 X^2 - 10^4 Y$$

$$10^4 X^2 - X - 10^4 Y = 0$$

$$X = \frac{1 \pm \sqrt{1 + 4 \cdot 10^4 \cdot 10^4 Y}}{2 \cdot 10^4}$$

$$X = \frac{\pm \sqrt{4 \cdot 10^4 \cdot 10^4 Y}}{2 \cdot 10^4}$$

$$X \approx \pm \sqrt{Y}$$

$$X^2 \approx \pm Y$$

It should be noted that the above equation is true for instantaneous value of Y. For Y cyclic about a bias point, its frequency content is twice as high as at X.

The operation of the Square Root of Transient Circuit ($\sqrt{T}$ C) is as follows: the high gain comparator amplifier 10 compares Y and $X^2$ where Y can be a complex, wideband, frequency modulated microwave signal such as those transmitted by radars and $X^2$ is the output of the Hall element 16. The difference between Y and $X^2$ is amplified to drive the current input on conductor 14 and the flux input on conductor 15 to Hall element 16 and also to furnish an output on conductor 9. The output of Hall element 16 is the instantaneous multiplication of the flux field, current and a constant (K). To understand the frequency doubling capability of the Hall element, it should be remembered that a minus times a minus equals a plus and also that a plus times a plus gives a plus. The plus half of a current sine wave times the plus half of a magnetic flux wave gives a plus output as does the negative current times a negative flux $(K\sin\omega t)^2 = (K^2/2)(1-\cos 2\omega t)$. The Hall element is in the feedback loop across the comparator amplifier and is therefore a forcing function. Any small differences between the alternating current in the $X^2$ output of the Hall element and Y is amplified forcing the output of the comparator amplifier to go to X. The alternating current portions of the Hall element output and the comparator amplifier output are the only parts of interests as the RC networks drop out the direct current portions. Therefore, the above equation is simplified to $(\sin\omega t)^2 = 1-\cos 2\omega t$. It is the $1-\cos 2\omega t$ term which is compared to Y forcing the output of the comparator amplifier to the square root of $(1-\cos 2\omega t)$ which is also the square root of $(\sin\omega t)^2$ or just $\sin\omega t$; the half frequency. To conform to pulses with frequency modulation, the loop delays must be very low. A maximum delay of 10 pico seconds should not be exceeded.

It is assumed that the delay around the loop consisting of the comparator amplifier, the balancing network, and Hall element is negligible. For signal Y frequencies of 1 GHZ, the loop delays should be under 10 pico seconds. The $\sqrt{T}$ C must, therefore, be construed so as to minimize the delays. Microwave integrated circuit construction is probably the best approach to minimize the delay. Stripline would connect the elements. The output stripline of the balancing network would go to a three-way power splitter. One fraction of the power would be the $\pm \sqrt{Y}$ output. The other output would be turned so as to intersect at 90°. One stripline would pass under the other. The flux field of the top stripline would, therefore, pass through the bottom stripline and be at 90° to the current in the bottom line. Providing that the section of the bottom line was of a material to allow efficient Hall operation, a Hall voltage proportional to $X^2$ would be developed across the line. It may be easier to construct if the Hall element were in the top line rather than the bottom line. The process is essentially the same whether the Hall element is in the top or bottom line.

Figure 2:
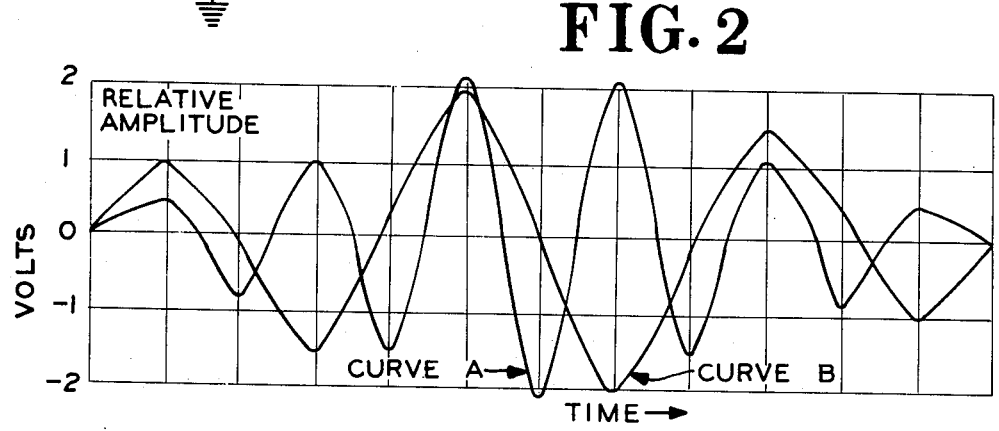
FIG. 2 is a graph of the input and output of the circuit shown in FIG. 1.

Turning to FIG. 2, curve A represents both Y and $X^2$ inputs to the comparator amplifier with $X^2$ AC coupled. Actually there is a small difference between Y and $X^2$ multiplied by the gain of the comparator amplifier. Curve B of FIG. 2 shows the small difference between Y and $X^2$ multiplied by the gain of the comparator amplifier.

Figure 3:
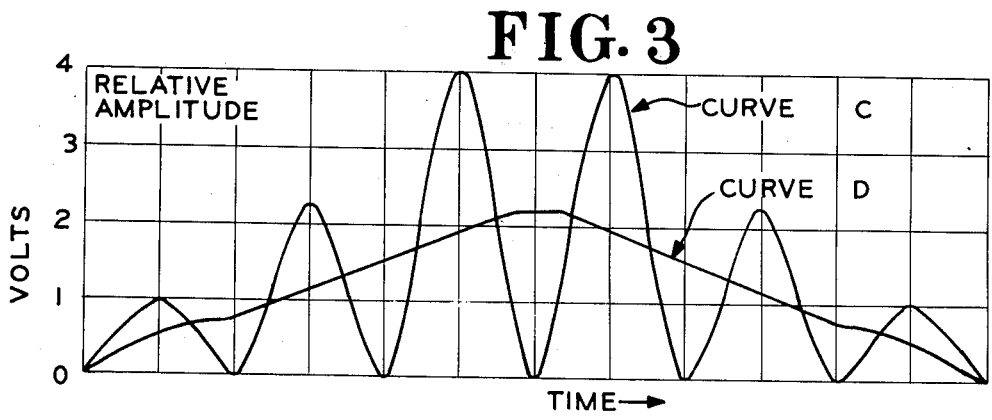
FIG. 3 is a graph of the Hall element output and the low frequency factor.

Turning to FIG. 3, curve C is the direct output of the Hall element and is all positive. Curve D is the dc offset of curve C. Subtracting curve D from curve C gives curve A of FIG. 2. Only a few cycles of curves A, B, and C are shown for one cycle of curve D for ease of drawing. In actuality, a typical radar pulse, one microsecond long might have 5,000 cycles over the distance of one cycle of curve D. This makes RC filtering relatively easy.

Figure 5:
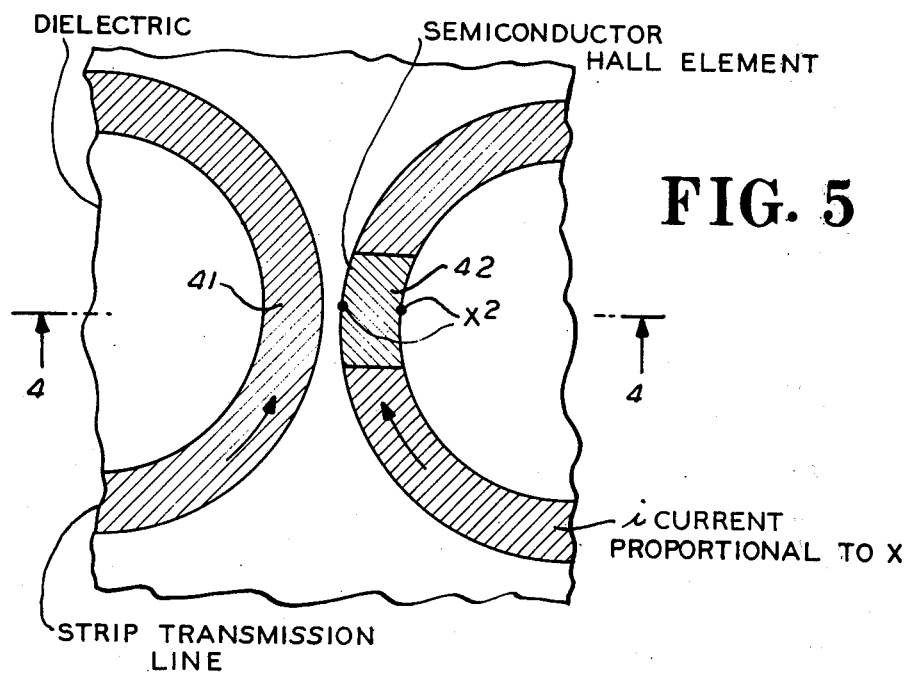
FIG. 5 is a plan view taken along the line 5—5 of FIG. 4 of a section of the Hall element with the top dielectric slab removed.
Figure 4:
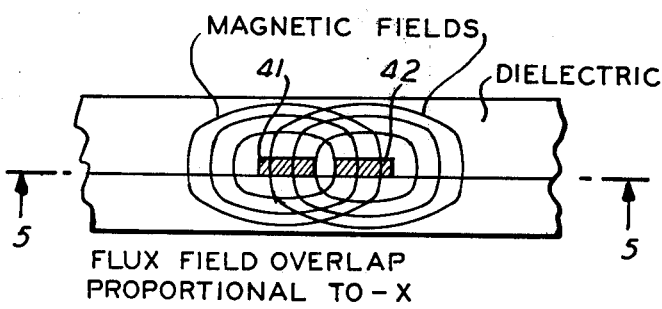
FIG. 4 is a cross section taken along the line 4—4 of FIG. 5 of the dielectric of the Hall element showing two striplines.

FIGS. 4 and 5 sketch one way to locate the Hall element so as to perform the multiplying function; that is, cause the current through one stripline and the flux field from a second stripline to properly interface in the Hall element. FIG. 4 shows a cross section of the dielectric sandwich with two striplines. One is marked 41, which is metal, and the other is marked 42, which is a semiconductor with a high Hall effect. The lines 43 around striplines 41 and 42 are magnetic flux lines. The lines from stripline 41 are shown going through Hall element of stripline 42. FIG. 5 sketches a plane view of a section of the Hall element with the top dielectric slab removed to show striplines 41 and 42. The arrows show the currents in each stripline which are proportional to X. The magnetic flux from stripline 41 goes through stripline 42 because of the proximity. Voltage taps are shown on the Hall element bringing out $X^2$. Constructing amplifiers on stripline and capacitively coupling from stripline to amplifiers is conventional practice and is not shown in FIGS. 4 and 5.

The $\sqrt{T}$ C's can be cascaded to divide frequencies by 4 or 8 if required. The loop delays are a factor in each $\sqrt{T}$ C but do not add when the units are cascaded. The frequency of signal Y is halved in the $\sqrt{T}$ C but the amplitude is proportional to the square root which must be considered when returning to the original frequency. In the case of radar target simulation using a three-state divider, it will require an eight-stage Cascaded Data Modulation System (CDMS) to return to the original frequency. The eight-stage (CDMS) will cause an 8 times multiplication of amplitude which matches the three-stage divider by 8 times.

Figure 6:
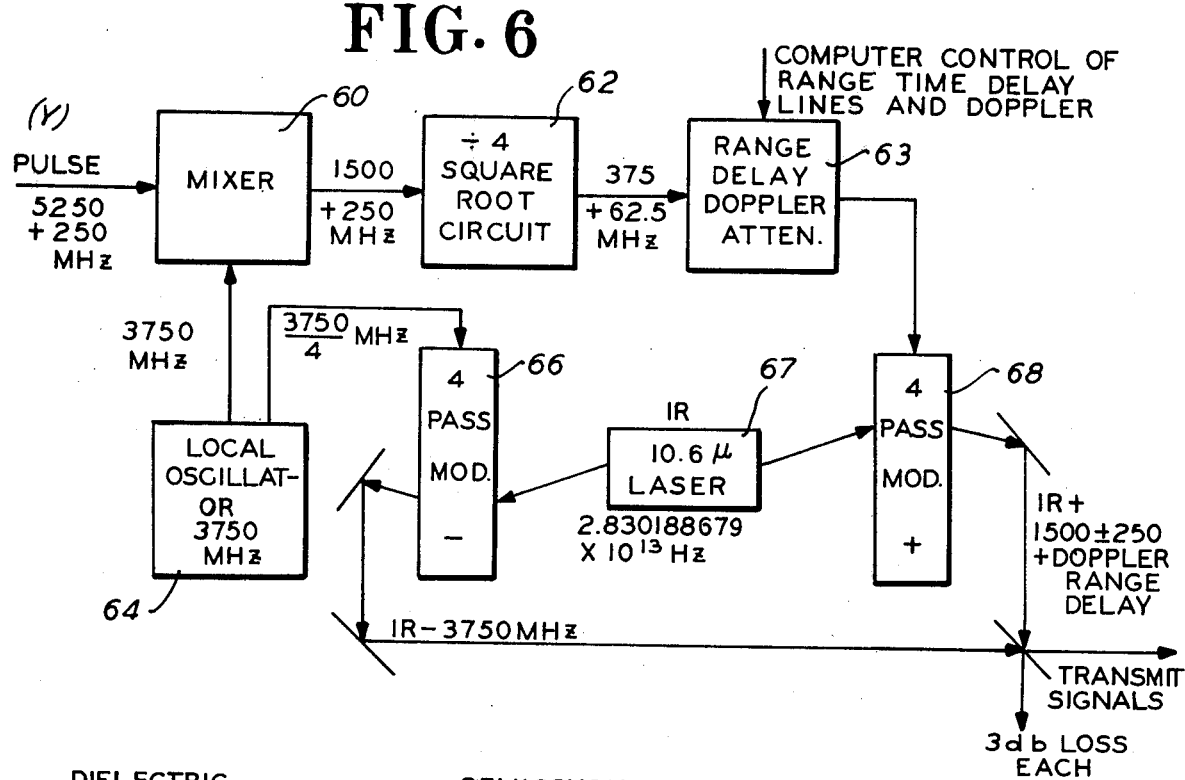
FIG. 6 is a block diagram showing the use of two cascaded square root transient circuits.

Referring to FIG. 6, there is a block diagram employing two $\sqrt{T}$ C's. The block 62, marked ÷ 4 Square Root Circuit, is actually two of the $\sqrt{T}$ C's since one $\sqrt{T}$ C only divides by 2. This figure shows a local oscillator 64 for heterodyning the signal Y in mixer 60 to lower the center frequency of the radar signal followed by the block 62 marked ÷ 4 Square Root Circuit. The block 63, marked Range Delay Doppler Attenuator, is the primary signal processing required to modify the radar pulse to simulate the effects of radar to target range, doppler, scintillation and atmospheric effects. The 4 pass modulators 66 and 68 multiply the signals back to the required bandwidths and center frequencies. The output of modulator 66 is infrared (IR from source 67) minus local oscillator frequency from source 64. The output of modulator 68 is infrared from source 67 plus the intermediate frequency (1,500 HZ) from block 63 with all the radar to target simulations. The signals from modulators 66 and 68 are heterodyned at an Angle Simulation Target Array (not shown) to recreate the original 5,250±250 MHZ radar signal (Y) with all the target simulations present. The frequency 5,250±250 MHZ has no particular significance except that it is somewhat centered in the frequency band available for radars.

From the foregoing, a circuit for reducing the center frequency and bandwidth of radar type signals has been described. The discussion herein has been related to the use of the circuit of the invention on transient signals which indicate a noncontinuous electronic waveform with a very short time duration and a broad frequency content. The circuit of the invention is also capable of operation on continuous wave (CW) signals. The reason for calling the present invention a transient circuit is because the circuit is most likely to be used to process transient signals.

I wish it to be understood that I do not desire to be limited to the exact details of construction shown and described, for obvious modifications can be made by a person skilled in the art.

I claim:

1. A circuit for reducing the center frequency and bandwidth of microwave signals comprising:
    a source of microwave signals for input to said circuit,
    means for doubling said signals derived from said circuit comprising a Hall element having a current input and a flux input,
    an RC network for removing the dc component from said signal derived from said circuit and for balancing said derived signal about zero wherein said Hall element and RC network for said derived signals comprise a feed-back circuit to the input of said comparator amplifier,
    means for comparing said input with said signals derived from said circuit and amplifying a difference signal obtained therebetween said means comprising a comparator amplifier whereby the square root of the amplitude of the difference signal is obtained at the output of said circuit, and
    an RC network for removing the dc component from said amplified difference signal and for balancing said derived signal about zero.

2. A circuit for reducing the center frequency and bandwidth of microwave signals comprising:
    a source of microwave signals for input to said circuit,
    means for doubling said signals derived from said circuit comprising a Hall element having a current input and a flux input wherein said Hall element comprises a first stripline having a current following therethrough and second stripline having the flux field therein cutting across said first stripline,
    means for removing the dc component from said signals derived from said circuit,
    means for comparing said input signals with said signals derived from said circuit and for obtaining a difference signal therebetween,
    means for amplifying said difference signal, whereby the output of said circuit is a signal having a center frequency and bandwidth reduced by one half the frequency and bandwidth of said input signals, and
    means for removing the dc component from said amplified difference signal.

3. The circuit of claim 2 comprising:
    an RC network for removing the dc component from said amplified difference signal and for balancing said output signal about zero.

4. The circuit of claim 3 comprising:
    an RC network for removing the dc component from said signal derived from said circuit and for balancing said derived signal about zero.

5. The circuit of claim 4 wherein said means for comparing said input and derived signals and amplifying the difference signal therebetween comprises a comparator amplifier whereby the square root of the amplitude of the difference signal is obtained at the output of said circuit.

6. The circuit of claim 5 wherein said Hall element and RC network for said derived signals comprise a feedback circuit to the input of said comparator amplifier.

7. The circuit of claim 6 wherein said first stripline is made of metallic material and said second stripline is made of semiconductor material sandwiched between dielectric material.

8. The circuit of claim 7 comprising:
    additional circuits for reducing center frequency and bandwidth of microwave signals comprising a comparator, amplifiers, a Hall element and balancing networks said additional circuits connected in cascade with said first circuit whereby said input signal is reduced by a factor of one half for each connected additional circuit.

* * * * *